United States Patent
Chen (10) Patent No.: US 9,792,042 B2
(45) Date of Patent: Oct. 17, 2017

(54) SYSTEMS AND METHODS FOR SET MEMBERSHIP MATCHING

(71) Applicant: Red Hat, Inc., Raleigh, NC (US)

(72) Inventor: Huamin Chen, Westboro, MA (US)

(73) Assignee: Red Hat, Inc., Raleigh, NC (US)

( * ) Notice: Subject to any disclaimer, the term of this patent is extended or adjusted under 35 U.S.C. 154(b) by 77 days.

(21) Appl. No.: 14/919,264

(22) Filed: Oct. 21, 2015

(65) Prior Publication Data

US 2017/0115889 A1   Apr. 27, 2017

(51) Int. Cl.
*G06F 3/06* (2006.01)

(52) U.S. Cl.
CPC .......... *G06F 3/0608* (2013.01); *G06F 3/0641* (2013.01); *G06F 3/0664* (2013.01); *G06F 3/0683* (2013.01)

(58) Field of Classification Search
CPC .......... G06F 9/45558; G06F 17/30156; G06F 3/0641; G06F 11/1453; G06F 9/45533; G06F 3/064; G06F 17/30097; G06F 3/0608; G06F 3/0664; G06F 3/0683
See application file for complete search history.

(56) References Cited

U.S. PATENT DOCUMENTS

| | | | |
|---|---|---|---|
| 5,819,021 A | 10/1998 | Stanfill et al. | |
| 7,865,503 B2 | 1/2011 | Piedmonte | |
| 8,018,940 B2 | 9/2011 | Hao et al. | |
| 8,199,652 B2 | 6/2012 | Lim | |
| 8,266,506 B2 | 9/2012 | Hao et al. | |
| 8,572,312 B2 | 10/2013 | Tofano | |
| 8,583,687 B1 | 11/2013 | Piedmonte et al. | |
| 8,751,763 B1* | 6/2014 | Ramarao | G06F 17/30159 711/162 |
| 8,762,396 B2 | 6/2014 | Hudzia et al. | |
| 2003/0033138 A1 | 2/2003 | Bangalore et al. | |
| 2009/0202156 A1* | 8/2009 | Konishi | G06T 7/33 382/209 |

(Continued)

OTHER PUBLICATIONS

Canale et al., Set Membership Approximation Theory for Fast Implementation of Model Predictive Control Laws, Jan. 2009, Department of Control and Computer Engineering, Politecnico di Torino, Corso Duca degli Abruzzi 24, 10129 Torino, Italy (2 pages).

(Continued)

*Primary Examiner* — Hashem Farrokh
(74) *Attorney, Agent, or Firm* — K&L Gates LLP (57) ABSTRACT

Various examples are directed to systems and methods for matching a test data block to a data block set. A computing device may receive the test data block. The computing device may determine that a first filter describing a first data block subset of the data block set indicates that the test data block is not in the first data block subset and determine that a second filter describing a second data block subset of the data block set indicates that the test data block is in the second data block subset. An average reference frequency of the second data block subset may be less than an average reference frequency of the first data block subset. The computing device may verify that the test data block is in the second data block subset and return an indication that the test data block is in the data block set.

20 Claims, 5 Drawing Sheets

(56) References Cited

U.S. PATENT DOCUMENTS

2015/0161194 A1* 6/2015 Provenzano ...... G06F 17/30386
　　　　　　　　　　　　　　　　　　　　　　　707/690

OTHER PUBLICATIONS

Data Partitioning Guidance, excerpt from https://msdn.microsoft.com/en-us/library/dn589795.aspx (9 pages).
Dong et al., Efficiently Matching Sets of Features with Random Histograms, Oct. 26-31, 2008, Department of Computer Science, Princeton University 35 Olden Street, Princeton, NJ 08540, USA (10 pages).

* cited by examiner

SYSTEMS AND METHODS FOR SET MEMBERSHIP MATCHING

BACKGROUND

Set membership matching is used in a number of different contexts to determine whether a given data item is included in a given set of data items. Set membership matching is used in a number of different functions, including, for example, data deduplication. For example, in data deduplication, a computing device may determine whether a data block is a duplicate of an existing data block at the computing device by performing set membership matching.

SUMMARY

Various examples are directed to systems and methods for matching a test data block to a data block set. A computing device may receive the test data block. The computing device may determine that a first filter describing a first data block subset of the data block set indicates that the test data block is not in the first data block subset and determine that a second filter describing a second data block subset of the data block set indicates that the test data block is in the second data block subset. An average reference frequency of the second data block subset may be less than an average reference frequency of the first data block subset. The computing device may verify that the test data block is in the second data block subset and return an indication that the test data block is in the data block set.

In some examples, the computing device may implement deduplication. For example, the computing device may receive the test data block in a write request along with a logical name describing at least the test data block. The first and second filters may be Bloom filters. Also, in some examples, returning the indication that the test data block is in the data block set may comprise writing to a data storage device data associating the logical name with the location of an equivalent data block.

FIGURES

Various examples are described herein in conjunction with the following figures, wherein.

DESCRIPTION

Various examples are directed to systems and methods for performing set membership matching on a data block set utilizing data block subsets determined based on reference frequency. Set membership matching may include determining whether a given data block (sometimes referred to herein as a test data block) is a member of a set of data blocks (sometimes referred to herein data block set). A test data block may be a member of a data block set when the data block set includes an equivalent data block (e.g., a data block having the same value as the test data block).

In various examples, a computing device may perform set membership matching by comparing the test data block to a first subset of the data block set that includes data blocks having the highest reference frequency. The comparison may utilize a Bloom filter, as described herein. If the test data block is a member of the first subset, then the computing device may conclude that the test data block is part of the data block set. If the test data block is not a member of the first subset, then the computing device may compare the test data block to a second subset of the data block set having a reference frequency less than the reference frequency of the first subset. The computing device may continue comparing the test data block to subsets (e.g., subsets with successively lower reference frequencies) until the data block is either found to be a member of one of the subsets (and thus a member of the data block set) or determined to not be a member of any subset.

Examples of set membership matching disclosed herein may provide benefits in various contexts including, for example, data deduplication. Computing devices use data deduplication to prevent the same data block from being stored on a data storage device at more than one physical location, which is not an efficient use of data storage. When a computing device determines that a data block is or would be stored at more than one physical location, it may store the data block once and utilize pointers or other referencing constructs to direct relevant requests to the one stored copy of the data block. Examples of set membership matching, as described herein, may also be used to manage a data cache, such as dedicated cache memory and/or data cache stored on another storage device. For example, cached data may be divided into a plurality of partitions (e.g., subsets) of data blocks based on reference frequencies. When a data block is to be written to the cache, the computing device may compare it to the subsets of data blocks as described herein.

Virtual machines are one example of an environment where the set membership matching examples described herein may be used to improve the efficiency of deduplication. According to a virtual machine environment, a computing device (such as a server) hosts multiple virtual machines. A software layer, often referred to as a hypervisor, runs on the server above the hardware layer and below the virtual machines. The hypervisor creates a virtualized hardware layer that is exposed to the virtual machines. This may provide some or all of the virtual machines with dedicated virtual hardware, such as virtual processors, data storage, network cards, etc. The hypervisor may implement the virtualized hardware layer using the underlying hardware of the computing device. As a result, the physical data storage device or devices of the computing device store data from all of the virtual machines that it hosts. Often, large portions of this data will be redundant. For example, multiple virtual machines at the computing device may execute some of the same or similar operating systems, applications, etc., which may have common data blocks. The hypervisor or other component at the computing device may utilize the set membership matching examples described herein to identify redundant data blocks and store only one example that may be utilized by multiple virtual machines.

In some of the set membership matching examples described herein, Bloom filters may be used to compare a test data block to a data block set and/or to a subset of the data block set. A Bloom filter comprises an indexed bit vector. Each bit in the bit vector may be described by an index value (e.g., from 0 to (n−1), where n is the number of bits in the bit vector). A computing device may generate the bit vector by applying a set of hash functions to each of the data blocks in the data block set. The hash functions may return integer hash values between 0 and (n−1). For each hash value generated by applying one of the set of hash functions to one data block from the data block set, the computing device may assert the corresponding bit in the bit vector. In this way, the bit vector describes the set of data blocks.

The bit vector and set of hash functions may be used subsequently to determine whether a test data block is part of the data block set. The computing device may apply the set of hash functions to the test data block to generate a set of test data block hash values. If all of the set of test data block hash values correspond to asserted bits at the bit vector, then the Bloom filter result may be positive. If any of the set of test data block hash values corresponds to an unasserted bit at the bit vector, then the Bloom filter result may be negative. A negative result indicates that the test data block is not part of the data block set. On the other hand, a positive result indicates that the test data block is probably, but not definitely, part of the data block set. When a positive result is obtained, the computing device may perform an additional comparison between the test data block and the data block set to verify that the test data block is part of the data block set. Any suitable type of additional comparison may be used such as, for example, a full-length data comparison.

For efficient execution of a Bloom filter, it is sometimes desirable to reduce false positives (e.g., situations where the Bloom filter result is positive, yet the test data block is not part of the data block set). For example, each false positive may require the computing device to perform the subsequent comparison which would not be necessary had the Bloom filter result been negative. False positives can be reduced by increasing the number of hash functions in the hash function set and/or by increasing the number of bits in the bit vector. Both of these actions, however, increase the processing resources that are necessary both to create the bit vector and to perform set membership matching, especially for large data block sets. In various examples, Bloom filters may be utilized to perform set membership matching on a data block set utilizing data block subsets determined based on reference frequency.

Figure 1:
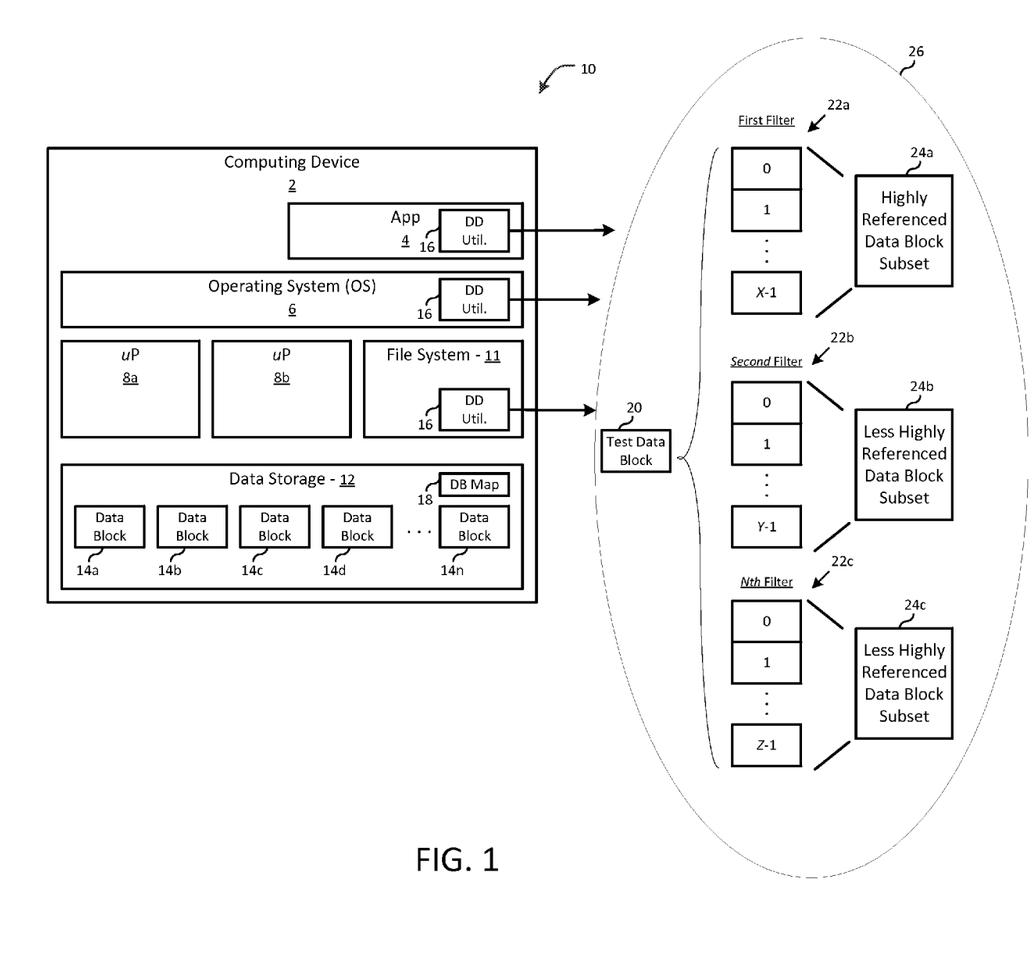
FIG. 1 is a diagram showing one example of an environment for performing set membership matching on a data block set utilizing data block subsets determined based on reference frequency.

FIG. 1 is a diagram showing one example of an environment 10 for performing set membership matching on a data block set utilizing data block subsets determined based on reference frequency. The environment 10 comprises computing device 2. The computing device 2 may comprise various hardware including one or more processors 8a, 8b, and a data storage device 12. As used herein, processor or processor 8a, 8b may refer to a device capable of executing instructions encoding arithmetic, logical, and/or I/O operations. In some examples, a processor may follow the Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual processor dies are included in a single integrated circuit package and hence share a single socket). A processor may also be referred to as a central processing unit (CPU). The data storage device 12 may be any suitable type of data storage device including, for example, one or more disks, one or more solid state drives, random access memory (RAM), cache memory, etc. In some examples, the data storage device 12 may comprise multiple physical devices. In some examples, additional hardware may be included such as, for example, network adapters, various sensors, etc.

Above the hardware 8a, 8b, 12, An operating system 6 and file system 11 may provide an interface between one or more applications 4 and the hardware 8a, 8b, 12. For example, the application 4 may provide data requests to the operating system 6. Data requests may include any type of request to manipulate data (e.g., data stored at the data storage device 12). Example data requests include read requests and write requests. Data requests may include a logical name referring to one or more data blocks 14a, 14b, 14c, 14d, 14n to be read or written and an operation to be performed on the data block. When the data request is a write request, it may also include a data block or blocks to be written to the data storage device 12. The logical name, for example, may refer to a file, directory, etc., or other logical grouping, which may be defined by the file system 11 of the relevant data storage device 12. In some examples, the logical name may be a logical name of a data block or data blocks. The operating system 6 and/or the file system 11 may identify one or more of the data blocks 14a, 14b, 14c, 14d, 14n referenced by the logical name and perform the requested operation.

Data blocks 14a, 14b, 14c, 14d, may be units or blocks of data below the logical or file level. For example, logical constructs, such as files, directories, metadata, etc., may include one or more of the data blocks 14a, 14b, 14c, 14d, 14n. In some examples, data blocks are sized to correspond to the smallest unit of data handled by the data storage device 12, which may depend on the physical device or devices making up the data storage device 12 and/or the organization of the file system 11. In some examples, data blocks 14a, 14b, 14c, 14d, 14n may correspond to physical sectors at the data storage device 12 or its subcomponents. For example, some physical data storage devices use sectors that are 4 kilobytes. Some data storage devices may use slightly larger sectors, for example, including additional bytes that may be used for a checksum. Other example sector sizes include 512 bytes, 1024 bytes, etc. Accordingly, some examples may utilize data blocks 14a, 14b, 14c, 14d, 14n that are 512 bytes, 1024 bytes, 4 kilobytes, or any other suitable size. Also, in some examples, data blocks 14a, 14b, 14c, 14d, 14n may correspond to clusters of the file system 11. For example, a typical file system cluster may be 4096 bytes or 4 kilobytes (kB) and, some physical storage devices, such as CD-ROM's, have clusters that are 2048 bytes (2 kB). Accordingly, 4 kB and 2 kB data blocks may be used in some embodiments.

In various examples, the computing device 2 may also comprise a deduplication utility 16 to perform set membership matching as described herein. The deduplication utility 16 may be executed by one or more of the processors 8a, 8b and may be resident at any suitable logical level of the computing device 2. In some examples, the deduplication utility 16 may be executed with the file system 11. In some examples, the deduplication utility 16 may be executed at the operating system 6. In some examples, the deduplication utility 16 may be executed at the application 4. Also, in some examples, the deduplication utility 16 may be omitted and its functionality described herein may be performed by the operating system 6, the file system 11, the application 4, or another component of the computing device 2.

The deduplication utility 16, for example, may operate in response to data requests. For example, a data block map 18 may be maintained at the data storage 18. The data block may 18 may relate logical names of data blocks (or groups of data blocks) to the locations of specific data blocks 14a, 14b, 14c, 14d, 14n at the data storage device 12. When a read request is received, the deduplication utility 16 may consult the data block map 18 to identify the data block or blocks 14a, 14b, 14c, 14d, 14n corresponding to the logical name included with the read request. The referred-to data block or blocks 14a, 14b, 14c, 14d, 14n may be returned to the requesting application 4.

When a write request is received, the deduplication utility 16 may perform set membership mapping, as described herein, to determine whether the data block or blocks included in the write request are already stored at the data storage 12 (e.g., are already part of the data block set including the data blocks 14a, 14b, 14c, 14d, 14n stored at the data storage 12). The environment 10 of FIG. 1 further shows a breakout section 26 illustrating set membership mapping that may be performed by the deduplication utility 16. For example, the write request may include a test data block 20 (e.g., a data block to be written to the data storage 12). The deduplication utility 16 may match the test data block 20 to a first data block subset 24a using a first filter 22a. In some examples, the data block subset 24a may include data blocks from the data storage device 12 that are referenced at the highest frequency. The reference frequency of data blocks 14a, 14b, 14c, 14d, 14n and data block subsets 24a, 24b, 24c may be determined, for example, as described herein with respect to FIG. 2.

The first filter 22a may be a Bloom filter having X bits in its bit vector. If the result of applying the first filter 22a to the test data block 20 is positive, the deduplication utility 16 may perform an additional comparison between test data block 20 and the first data block subset 24a to verify that the test data block 20 is included in the first data block subset 24a. Because the first data block subset 24a includes fewer data blocks than the full set (which may include all of the data blocks 14a, 14b, 14c, 14d, 14n in the data storage device 12), the additional comparison may require less time and/or fewer processing resources than if it were performed against the entire data block set. If the result of the first filter 22a is negative, or the additional comparison otherwise indicates that the test data block 20 is not part of the first data block subset 24a, the deduplication utility 16 may utilize a second filter 22b to determine whether the test data block 20 is part of a second data block subset 24b with a lower reference frequency than the first data block subset 24a. If test data block 20 is not included in the second data block subset 24b, the deduplication utility 16 may, optionally, utilize a third filter 22c to determine whether the test data block 20 is part of a third data block subset 24c with a lower reference frequency than the second data block subset 24b. This may continue until the deduplication utility 16 either determines that the test data block 20 is part of one of the data block subsets 24a, 24b, 24c, etc., or determines that it is not part of any subset. In different examples, any suitable number of data block subsets may be used. The filters 22a, 22b, 22c may utilize the same hash functions, or different hash functions.

If the deduplication utility 16 determines that the test data block 20 is in any of the data block subsets 24a, 24b, 24c, etc., it may suspend consideration of additional data block subsets 24b, 24c, etc. The deduplication utility 16 may write to the data block map 18 a reference to the equivalent of the test data block 20 that was identified. The reference may include, for example, data indicating a location of the equivalent data block from the data block set. In this way, the deduplication utility 16 may prevent the computing device 2 from storing multiple, identical data blocks at the data storage device 12. If the deduplication utility 16 determines that the test data block 20 is not in any of the data block subsets 24a, 24b, 24c, etc., it may write the test data block 20 to a location at the data storage device 12 and write a reference to the location of the test data block 20 to the data block map 18.

Figure 2:
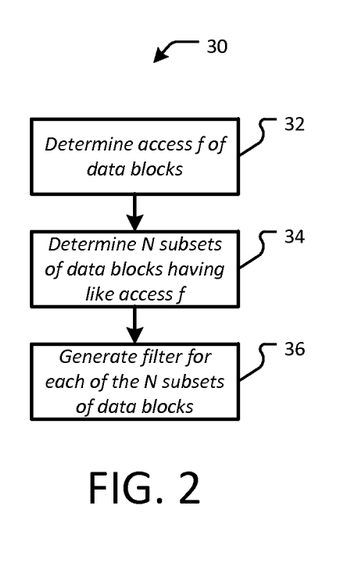
FIG. 2 is a flow chart showing one example of a process flow that may be executed by a computing device to generate from a data block set data block subsets and filters for set membership matching.

FIG. 2 is a flow chart showing one example of a process flow 30 that may be executed by a computing device to generate from a data block set data block subsets and filters for set membership matching. The process flow 30 is described herein as being executed by the computing device 2. For example, the process flow 30 may be executed by the deduplication utility 16 or any other suitable component of the computing device 2. The process flow 30, however, may be executed by any suitable computing device.

At 32, the computing device 2 may determine reference frequencies for data blocks included in a data block set. In some examples, the data block set may be a set including all or a portion of the data blocks 14a, 14b, 14c, 14d, 14n stored at the data storage device 12. The reference frequency for a data block may describe the frequency with which data blocks having the same value as the data block are compared to the data block set. In the context of data deduplication, the reference frequency for a data block may refer to the number and/or frequency of write requests that request storage of a test data block that has the same value as the data block.

At 34, the computing device 2 may determine a number of data block subsets from the data block set. Subsets of data blocks, such as 24a, 24b, 24c may include data blocks with similar reference frequencies. For example, the computing device 2 may rank data blocks from the data block set in order of reference frequency. The computing device 2 may then divide the ordered list pro rata into the desired number of subsets. For example, in a data block set including ten data blocks to be divided into two data block subsets, the five data blocks with the highest reference frequencies may be assigned to a first data block subset while the five data blocks with the lowest reference frequencies may be assigned to a second data block subset. Also, for example in a data block set including twenty-four data blocks to be divided into three data block subsets, the eight data blocks with the highest reference frequency may be assigned to a first data block subset. After this, the eight highest reference frequency data blocks from among the remaining data blocks may be assigned to a second data block set. The final eight data blocks may be assigned to a third data block subset. In various examples, then, the average reference frequency of data blocks in the first data block subset may be higher than the average reference frequency of data blocks in the second data block subset. If there is a third data block subset, the average reference frequency of data blocks in the second data block subset may be higher than the average reference frequency of data blocks in the third data block subset, and so on.

At 36, the computing device 2 may generate a filter (e.g., a Bloom filter) for each of the data block subsets. Generating a filter for a data block subset may comprise, for example, selecting appropriate hash functions and applying the selected hash functions to each of the data blocks of the data block subset. A bit vector for the data block subset may then be determined, as described herein. In some examples, the computing device 2 may utilize the same set of hash functions to generate the filters for more than one of the data block subsets, or may use different hash functions for each data block subset.

Figure 3:
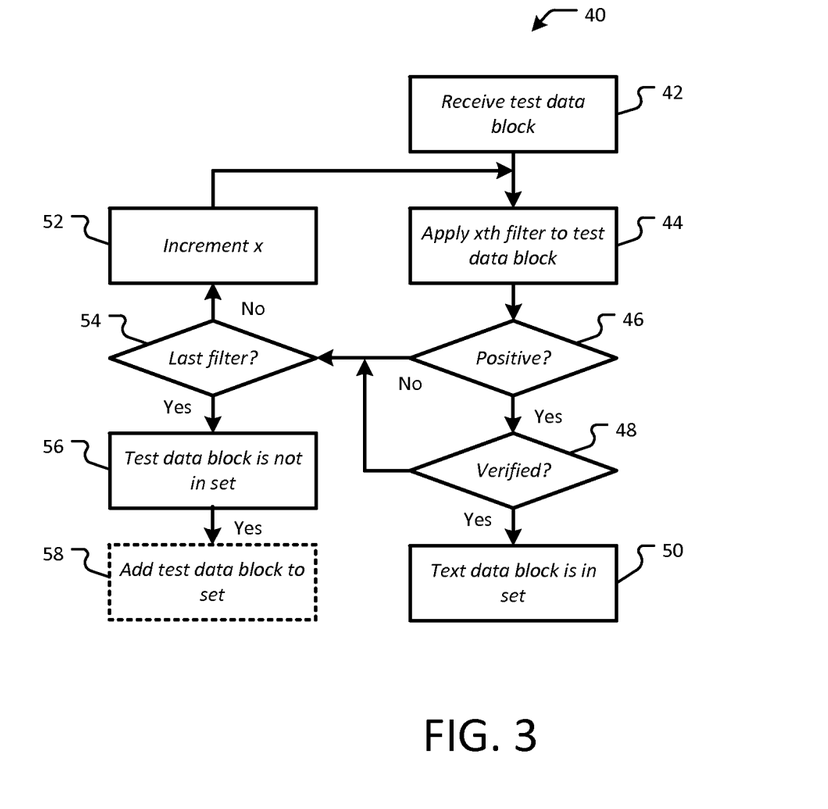
FIG. 3 is a flow chart showing one example of a process flow that may be executed by a computing device to perform set membership matching for a set of data blocks utilizing data block subsets and filters.

FIG. 3 is a flow chart showing one example of a process flow 40 that may be executed by a computing device 2 to perform set membership matching for a set of data blocks utilizing data block subsets and filters. Like the process flow 30, the process flow 40 is described as executed by the computing device 2. For example, the process flow 40 may be executed by the deduplication utility 16 or any other suitable component of the computing device 2. The process flow 40, however, may be executed by any suitable computing device.

At 42, the computing device 2 may receive a test data block to be compared to the data block set. For example, the computing device 2 may receive the test data block as part of a write request including a logical name of a data structure including the test data block and the test data block to be written to the data storage device 12 (e.g., test data block 20). The write request may be directed to a non-volatile data storage device. In some examples, the write request may be directed to a data cache. At 44, the computing device 2 may apply the a filter corresponding to a counter, referred to as x. At the outset, x may be equal to 1, so the first time the computing device 2 executes 44, it may execute the filter describing the data block subset with the highest reference frequency (e.g., filter 22a and data block subset 24a in the example of FIG. 1). As described above, results of applying the filter to the test data block may negative, indicating that the test data block is not part of the first data block subset, or positive, indicating that the test data block is possibly part of the first data block subset. If the filter returns a positive result, the computing device 2 may perform an additional comparison to determine if the test data block is a member of the first data block subset. If yes, at 48, the computing device may determine whether the test data block is in the first data block subset and, therefore, also in the data block set. For example, the computing device may perform an additional comparison between the test data block and the first data block subset. Any suitable comparison may be performed. In some examples, the additional comparison is a full length data comparison where the computing device compares the test data block to each data block of the first data block subset. In some examples, the additional comparison may also identify the location of the equivalent data block at the data storage 12 that has the same value as the test data block and associate the location of the equivalent data block with a logical name included in the write request. If the additional comparison indicates that the test data block is in the first data block set, then the computing device 2 may conclude, at 50, that the test data block is in the data block set.

If the filter considered at 44 returns a negative result at 46, or the alternative matching technique indicates that the test data block is not part of the data block subset considered at 48, then the computing device may determine, at 54, if the filter applied at 44 is the last filter. For example, if the filter counter has a value equal to the number of data block subsets, then the filter applied at 44 may have been the last filter. Referring to FIG. 1, for example, after applying the filter 22a describing the data block subset 24a, the computing device 2 may determine that the filter 22a was not the last filter. After applying the filter 22c describing the last data block subset 24c, however, the computing device 2 may determine that the filter 22c is the last filter. If the filter applied at 44 is not the last filter, then the computing device may, at 52, increment the filter counter and return to 44 to apply the next filter describing the next data block subset.

If at 54, the computing device 2 determines that the last filter has been applied, then it may determine at 56 that the test data block is not part of the data block set. For example, the computing device 2 may complete the write request of 42 by writing the test data block to the data storage device 12 and writing a reference to the location of the test data block at the data storage device to the data block map 18. Optionally, at 58, the computing device 2 may add the test data block to the data block set. For example, in deduplication, this may prevent the computing device 2 from writing a data block equivalent to the test data block to the data storage device 12 in response to a subsequent write request. Adding the test data block to the data block set may comprise, for example, assigning the test data block to one of the data block subsets; applying the hash functions associated with that data block subset to the test data block; and asserting any bits in the bit vector of the filter that correspond to a set of hash function results for the test data block but are not otherwise asserted. In some examples, the test data block is initially assigned to the data block subset including data blocks with the lowest reference frequency. The computing device 2 may maintain a reference count for the data block, which may be incremented each time that the test data block is subsequently referenced. If the reference frequency of the test data block increases, the computing device 2 may reassign the test data block to a higher-frequency data block subset.

Figure 4:
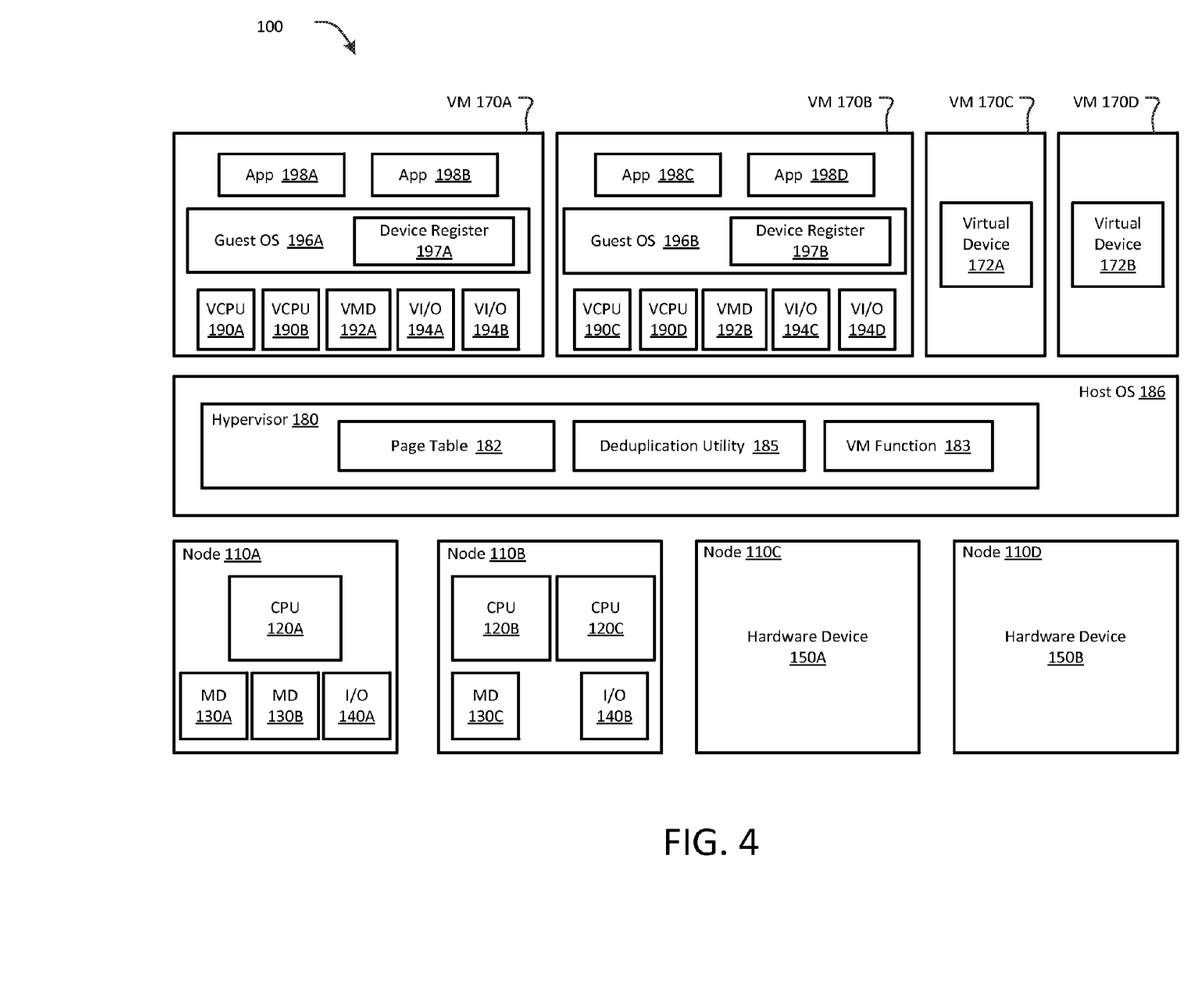
FIG. 4 is a high-level component diagram of an example computing device implementing deduplication utilizing set membership matching as described herein.

As described above, the example systems and methods for set membership matching described herein may be used to de-duplicate data at a computing device 100 hosting one or more virtual machines. FIG. 4 is a high-level component diagram of an example computing device 100 implementing deduplication utilizing set membership matching as described herein. The computing device 100 may include one or more interconnected nodes 110A-D. Each node 110A-B may in turn include one or more physical processors (e.g., CPU 120A-C) communicatively coupled to memory devices (e.g., MD 130A-C) and input/output devices (e.g., I/O 140A-B). Each node 110C-D may include a hardware device 150A-B. In an example embodiment, a hardware device (e.g., 150A-B) may include a network device (e.g., a network interface controller (NIC), a network adapter, or any other component that connects a computer to a computer network), a peripheral component interconnect (PCI) device, storage devices, sound or video adaptors, photo/video cameras, printer devices, keyboards, displays, etc. Memory devices 130A-C may include a volatile or non-volatile memory device, such as RAM, ROM, EEPROM, or any other device capable of storing data. As discussed herein, I/O devices 140A-B may include any device capable of providing an interface between one or more processor pins and an external device capable of inputting and/or outputting binary data.

Processors 120A-C may be interconnected using a variety of techniques, ranging from a point-to-point processor interconnect, to a system area network, such as an Ethernet-based network. Local connections within each node 110A-D, including the connections between a processor 120A and a memory device 130A-B and between a processor 120A and an I/O device 140A may be provided by one or more local buses of suitable architecture, for example, peripheral component interconnect (PCI). As used herein, a device of the host OS 186 (or "host device") may refer to CPU 120A-C, MD 130A-C, I/O 140A-B, a software device, and/or hardware device 150A-B. Although the computing device 100 comprises multiple nodes 110A-D, some examples may omit one or more of the nodes 110A-D. Some examples, may utilize a single CPU, memory device, or I/O device.

As noted above, computing device 100 may run multiple virtual machines (e.g., VM 170A-D), by executing a software layer (e.g., hypervisor 180) above the hardware and below the virtual machines 170A-D, as schematically shown in FIG. 4. In some examples, the hypervisor 180 may be a component of the host OS 186 executed by the computing device 100. In another example embodiment, the hypervisor 180 may be provided by an application running on the host OS 186, or may run directly on the computing device 100 without an operating system beneath it. The hypervisor 180 may virtualize the physical layer, including processors, memory, and I/O devices, and present this virtualization to virtual machines 170A-D as devices, including virtual processors (e.g., VCPU 190A-D), virtual memory devices (e.g., VMD 192A-B), and/or virtual I/O devices (e.g., VI/O 194A-D), etc.

In some examples, a virtual machine 170A-B may execute a guest operating system 196A-B which may utilize the underlying VCPU 190A-D, VMD 192A-B, and VI/O devices 194A-D. One or more applications 198A-D may be running on a virtual machine 170A-B under the guest operating system 196A-B. The virtual machine 170A-B may include a device register 197A-B. As used herein, a device register 197A-B refers to a configuration space of a device. In an example embodiment, a device may be a device (e.g., VCPU 190A-D, VMD 192A-B, VI/O devices 194A-D, virtual device 172A-B, etc.) of a guest operating system 196A-B (that is, a "guest device"). In an example embodiment, the device register 197A-B is a guest device register. In an example embodiment, a device register 197A-B may be a command register or a base address register (BAR). In an example embodiment, a device register 197A-B may include any known register used in the peripheral component interconnect (PCI) configuration space. In an example embodiment, a base address register (BAR) includes a base (or start) address of the guest device at which a memory region of the host device (which corresponds to the guest device) can be accessed and further includes a size indicator which denotes the size of the memory region of the host device.

In some examples, a virtual machine 170A-B may include multiple virtual processors (VCPU) 190A-D. Processor virtualization may be implemented by the hypervisor 180 scheduling time slots on one or more physical processors 120A-C such that from the guest operating system's perspective those time slots are scheduled on a virtual processor 190A-D. In some examples, a virtual machine 170C-D may include virtual devices 172A-B. A virtual device 172A-B may provide the functionality of traditional hardware devices such as network devices, PCI devices, storage devices, sound or video adaptors, photo/video cameras, printer devices, keyboards, displays, etc.

In some examples, the hypervisor 180 may provide one or more virtual machine functions (VM Functions) 183 to a virtual machine 170A-D. The code that a VM Function 183 runs on the physical processor(s) 120A-C may utilize the resources of host operating system (Host OS) 186, such as the memory devices 130A-C, and the input/output devices 140A-B as well as the resources of one or more of the virtual machines 170A-D including the virtual processors 190A-D, the virtual memory 192A-B, and the virtual I/O devices 194A-D. For example, the VM Function 183 may be called by a VM 170A to transfer data to, or access the resources of the Host OS 186 or another VM 170B. By contrast, each VM 170A may be limited to the use of its own resources including its VCPUs 190A-B, virtual memory 192A, and virtual I/O devices 194A-B unless it invokes a VM Function 183 as described below.

In various examples, the VM Function 183 may be invoked for a VM 170A, by the guest OS 196A that is running on the VM 170A. In some examples, a VM Function 183 may only be invoked if hypervisor 180 provides access or grants a request. For example, a VM 170A or guest OS 196A may invoke a VM Function 183 to handle a task more efficiently or using greater resources than are presently available to the VM 170A or guest OS 196A. In an example embodiment, a hypervisor 180 may grant a VM 170A or guest OS 196A access to a VM Function 183 to allow the VM 170A or guest OS 196A to access a resource without requiring an exit to the hypervisor. In an example embodiment, the hypervisor 180 may also deny the request by causing an undefined opcode exception or a general protection fault exception whenever the VM Function 183 is invoked.

The hypervisor 180 may also use one or more page table 182. A page table 182 is a data structure used by the hypervisor 180 to store a mapping of addresses of the guest OS 196A-B to addresses of the host OS 186 (e.g., physical resources of the computing device 100, such as physical addresses at the various memory devices 130A-C). For example, addresses of the guest OS 196A-B may reference virtual memory locations at the virtual memory devices 192A-B while addresses of the host OS 186 may reference memory locations at the memory devices 130A-C, which may be physical memory locations. Accordingly, address translation may be handled using page tables 182. For example, the guest OS 196A-B operating within the VMs 170A-D may be given the impression that there is a contiguous section of guest memory available, when in reality, the available guest memory may be spread across various memory devices 130A-C.

Figure 5:
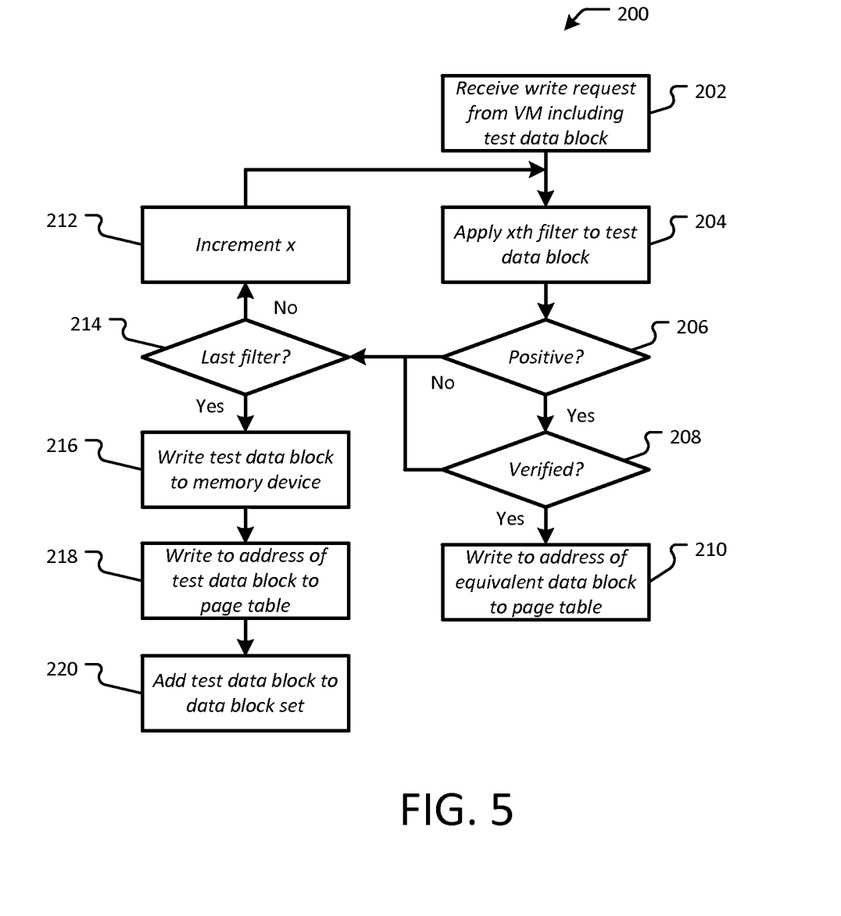
FIG. 5 is a flow chart showing one example of a process flow that may be executed by the hypervisor to perform data deduplication for virtual machines utilizing data block subsets and filters.

The hypervisor 180 may also comprise and/or utilize a deduplication utility 185 that may operate similar to the deduplication utility 16 described above. For example, the deduplication utility 185 may receive write requests from one or more of the VMs 170A-D and determine if the data block or blocks to be written already have equivalent data blocks stored at one or more of the memory devices 130A-C utilizing set membership matching, as described herein. For example, FIG. 5 is a flow chart showing one example of a process flow 200 that may be executed by the hypervisor 180 (e.g., the deduplication utility 185) to perform data deduplication for virtual machines utilizing data block subsets and filters, as described herein. Prior to execution of the process flow 200, the hypervisor 180 may have divided some or all of the data blocks at the memory devices 130A-C into data block subsets and derived a filter describing each subset, for example, as described herein at FIG. 2.

At 202, the hypervisor 180 may receive from a VM 170A-C a write request including a at least one data block to be written to a virtual memory device 192A-B (e.g., a test data block) and a logical name of a data structure including the at least one data block. In some examples, the logical name may be or comprise a virtual address at one or more of the virtual memory devices 192A-B. After execution of the process flow 200, the test data block may be physically stored one of the memory devices 130A-C while the page table 182 may indicate virtual memory device 192A-B treated as including the test data block for purposes of the requesting VM 170A-C. At 204, the hypervisor 180 may apply the a filter corresponding to a filter counter, again referred to in FIG. 5 as x. At the outset, x may be equal to 1, so the first time the hypervisor 180 executes 204, it may execute the filter describing the data block subset with the highest reference frequency. As described above, results of applying the filter to the test data block may be negative, indicating that the test data block is not part of the first data block subset, or positive, indicating that the test data block is possibly part of the first data block subset. If the filter returns a positive result, the hypervisor 180 may determine if an additional comparison demonstrates that the test data block is in the first data block subset. If yes, at 208, the computing device may determine that the test data block is in the first data block subset and, therefore, also in the data block set. Then, at 210, the hypervisor 180 may write an address of the equivalent data block to the test data block at a memory device 130A-C and write that address to the page table 182. This may allow the hypervisor 180 to respond to subsequent requests to access the test data block at the virtual memory device 192A-B by retrieving the equivalent data block from the appropriate memory device 130A-C.

If the filter considered at 204 returns a negative result at 206, or the additional comparison indicates that the test data block is not part of the data block subset considered at 208, then the computing device may determine, at 214, if the filter applied at 204 is the last filter. For example, if the filter counter has a value equal to the number of data block subsets, then the filter applied at 204 may have been the last filter. If the filter applied at 204 is not the last filter, then the hypervisor 180, at 212, may increment the filter counter and return to 204 to apply the next filter describing the next data block subset.

If, at 214, the hypervisor 180 determines that the last filter has been applied, then it may determine at 56 that the test data block is not part of the data block set (e.g., no equivalent data block is stored at the memory devices 130A-C). For example, the hypervisor 180 may complete the write request of 202 by writing the test data block to a memory device 130A-C and writing a reference to the location of the test data block at the selected memory device 130A-C to the data block map 18. At 218, the hypervisor 180 may add the test data block to the data block set. For example, in deduplication, this may prevent the hypervisor 180 from writing a data block equivalent to the test data block to the memory devices 130A-C in response to a subsequent write request. Adding the test data block to the data block set comprise, for example, assigning the test data block to one of the data block subsets; applying the hash functions associated with that data block subset to the test data block; and asserting any bits in the bit vector of the filter that correspond to a set of hash function results for the test data block but are not otherwise asserted.

Reference in the specification to, "examples," "various examples," "some examples," etc. means that a particular feature, structure, or characteristic described in connection with the example embodiments is included in at least one embodiment of the invention. The appearances of the above-referenced phrases in various places in the specification are not necessarily all referring to the same embodiment. Reference to embodiments is intended to disclose examples, rather than limit the claimed invention. While the invention has been particularly shown and described with reference to several embodiments, it will be understood by persons skilled in the relevant art that various changes in form and details can be made therein without departing from the spirit and scope of the invention.

It should be noted that the language used in the specification has been principally selected for readability and instructional purposes, and may not have been selected to delineate or circumscribe the inventive subject matter. Accordingly, the present disclosure is intended to be illustrative, but not limiting, of the scope of the invention.

It is to be understood that the figures and descriptions of example embodiments of the present disclosure have been simplified to illustrate elements that are relevant for a clear understanding of the present disclosure, while eliminating, for purposes of clarity, other elements, such as for example, details of system architecture. Those of ordinary skill in the art will recognize that these and other elements may be desirable for practice of various aspects of the present examples. However, because such elements are well known in the art, and because they do not facilitate a better understanding of the present disclosure, a discussion of such elements is not provided herein.

It is to be understood that the figures and descriptions of example embodiments of the present disclosure have been simplified to illustrate elements that are relevant for a clear understanding of the present disclosure, while eliminating, for purposes of clarity, other elements, such as for example, details of system architecture. Those of ordinary skill in the art will recognize that these and other elements may be desirable for practice of various aspects of the present examples. However, because such elements are well known in the art, and because they do not facilitate a better understanding of the present disclosure, a discussion of such elements is not provided herein.

In some examples of the present methods and systems disclosed herein, a single component can be replaced by multiple components, and multiple components replaced by a single component, to perform a given command or commands. Except where such substitution would not be operative to practice the present methods and systems, such substitution is within the scope of the present disclosure. Examples presented herein, including operational examples, are intended to illustrate potential implementations of the present method and system examples. Such examples are intended primarily for purposes of illustration. No particular aspect or aspects of the example method, product, computer-readable media, and/or system examples described herein are intended to limit the scope of the present disclosure.

The various components described herein may be and/or are executed by any suitable type of computing device including, for example, desktop computers, laptop computers, mobile phones, palmtop computers, personal data assistants (PDAs), etc. As used herein, a "computer," "computer system," "computing device," or "computing device," "machine," may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for processing data for standalone application and/or over a networked medium or media. Computers and computer systems disclosed herein may include operatively associated memory for storing certain software applications used in obtaining, processing, storing, and/or communicating data. Such memory can be internal, external, remote, or local with respect to its operatively associated computer or computer system. Memory may also include any means for storing software or other instructions including, for example and without limitation, a hard disk, an optical disk, floppy disk, ROM (read-only memory), RAM (random-access memory), PROM (programmable ROM), EEPROM (extended erasable PROM), and/or other like computer-readable media.

Some portions of the above disclosure are presented in terms of methods and symbolic representations of operations on data bits within a computer memory. These descriptions and representations are the means used by those skilled in the art to most effectively convey the substance of their work to others skilled in the art. A method is here, and generally, conceived to be a sequence of actions (instructions) leading to a desired result. The actions are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times, to refer to certain arrangements of actions requiring physical manipulations of physical quantities as modules or code devices, without loss of generality. It should be borne in mind, however, that all of these and similar terms are to be associated with the appropriate physical quantities and are merely convenient labels applied to these quantities. Unless specifically stated otherwise as apparent from the preceding discussion, throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system memories or registers or other such information storage, transmission, or display devices.

Certain aspects of the present disclosure include process steps and instructions described herein in the form of a method. It should be noted that the process steps and instructions of the present disclosure can be embodied in software, firmware, or hardware, and when embodied in software, can be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, magnetic-optical disks, read-only memories (ROMs), random-access memories (RAMs), electrically-programmable read-only memories (EPROMs), electrically erasable programmable read-only memories (EEPROMs), magnetic or optical cards, application-specific integrated circuits (ASICs), or any type of media suitable for storing electronic instructions, and each coupled to a computer system bus. Furthermore, the computers and computer systems referred to in the specification may include a single processor or may be architectures employing multiple processor designs for increased computing capability.

The methods and systems presented herein, unless indicated otherwise, are not inherently related to any particular computer or other apparatus. Various general-purpose systems may also be used with programs in accordance with the teachings herein, or it may prove convenient to construct more specialized apparatus to perform the disclosed method actions. The structure for a variety of these systems will appear from the above description. In addition, although some of the examples herein are presented in the context of a particular programming language, the present disclosure is not limited to any particular programming language. A variety of programming languages may be used to implement the teachings of the present disclosure as described herein, and any references above to specific languages are provided for disclosure of enablement and best mode of the present disclosure.

The term "computer-readable medium" as used herein may include, for example, magnetic and optical memory devices such as diskettes, compact discs of both read-only and writeable varieties, optical disk drives, and hard disk drives. A computer-readable medium may also include non-transitory memory storage that can be physical or virtual.

What is claimed is:

1. A method for deduplicating data blocks in a virtual machine environment, comprising:
   receiving, by a hypervisor executing at a computing device and from a virtual machine executing at the computing device, a write request comprising a logical name of a first data structure and a test data block, wherein the computing device comprises at least one processor and a data storage device in communication with the at least one processor, and wherein a data block set is stored at the data storage device;
   applying, by the hypervisor, a first set of hash functions to the test data block to generate a first set of test data block hash values;
   comparing, by the hypervisor, the first set of test data block hash values to a first filter bit vector describing a first data block subset of data blocks from a set of data blocks stored at the data storage device;
   determining, by the hypervisor, that the first set of test data block hash values do not match the first filter bit vector;
   applying, by the hypervisor, a second set of hash functions to the test data block to generate a second set of test data block hash values;
   comparing, by the hypervisor, the second set of test data block hash values to a second filter bit vector describing a second subset of data blocks from the set of data blocks stored at the data storage device, wherein an average reference frequency of the second subset of data blocks is less than an average reference frequency of the first data block subset;
   identifying, by the hypervisor and from the second subset of data blocks, a first equivalent data block having the same value as the test data block; and
   writing, by the hypervisor, an entry to a page table, the entry indicating a name of the test data block and an address of the first equivalent data block.

2. The method of claim 1, further comprising:
   determining, by the hypervisor and for a first data block of the data block set, a reference frequency describing a frequency at which the hypervisor receives write requests for data blocks having the same value as the first data block;
   assigning, by the hypervisor and to the first data block subset, a first plurality of data blocks including the first data block; and
   assigning, by the hypervisor and to the second data block subset, a second plurality of data blocks, wherein an average reference frequency of the first plurality of data blocks is higher than an average reference frequency of the second plurality of data blocks.

3. The method of claim 1, further comprising:
determining, by the hypervisor and for a first data block of the data block set, a first data block reference frequency describing a frequency at which the hypervisor receives write requests for data blocks having the same value as the first data block;
determining, by the hypervisor and for a second data block of the data block set, a second data block reference frequency describing a frequency at which the hypervisor receives write requests for data blocks having the same value as the second data block;
assigning a first half of data blocks from the data block set to the first data block subset, the first half of data blocks from the data block set comprising the first data block, and each of the first half of data blocks having a reference frequency higher than each of the reference frequencies of a second half of data blocks from the data block set; and
assigning the second half of data blocks from the data block set to the second data block sub set.

4. The method of claim 1, further comprising:
applying, by the hypervisor, the first set of hash functions to a first data block of the first data block subset to generate a set of hash function values for the first data block; and
setting, by the hypervisor a first bit of the first filter bit vector, the first bit corresponding to a first has function value from the set of hash function values for the first data block.

5. A computer system for deduplicating data blocks, comprising:
at least one processor;
a data storage device in communication with the at least one processor, wherein the data storage device comprises a data block set that comprises a plurality of data blocks and instructions that, when executed by the at least one processor, cause the at least one processor to:
receive a write request comprising a test data block and a logical name describing at least the test data block;
determine that a first Bloom filter describing a first data block subset of data blocks from the data block set stored at the data storage device returns a negative result for the test data block;
determine that a second Bloom filter describing a second data block subset of data blocks from the data block set stored at the data storage device returns a positive result for the test data block, wherein an average reference frequency for the second data block subset is lower than an average reference frequency for the first data block subset;
determine a location of an equivalent data block to the test data block at the data storage device; and
write to the data storage device data associating the logical name with the location of the equivalent data block.

6. The computer system of claim 5, wherein the data storage device further comprises instructions that, when executed by the at least one processor, cause the at least one processor to determine a first reference frequency for a first data block of the data block set, wherein the first reference frequency describes a frequency at which the computer system receives requests to write to the data storage device data blocks equivalent to the first data block.

7. The computer system of claim 5, wherein the data storage device further comprises instructions that, when executed by the at least one processor, cause the at least one processor to:
rank the plurality of data blocks from the data block set in order of reference frequency; and
assign the data blocks pro rata to a predetermined number of data block sets, the predetermined number of data block sets comprising the first data block subset and the second data block subset.

8. The computer system of claim 5, wherein the data storage device further comprises instructions that, when executed by the at least one processor, cause the at least one processor to determine the first data block subset and the second data block subset based at least in part on a reference frequency of a first data block selected from the plurality of data blocks.

9. The computer system of claim 5, wherein determining that the first Bloom filter returns a negative result for the test data block comprises:
applying a first set of hash functions to the test data block to generate a first test data block set of hash values; and
determining that a bit at a first Bloom filter bit vector having an index value equal to a first hash value from the first test data block set of hash values is not asserted.

10. The computer system of claim 5, wherein the data storage device further comprises instructions that, when executed by the at least one processor, cause the at least one processor to:
receive a write request comprising a second test data block and a second logical name describing at least the second test data block;
determine that the first Bloom filter returns a negative result for the second test data block;
determine that the second Bloom filter returns a negative result for the second test data block;
determine that there are no additional Bloom filters for the data block set; and
write the second test data block to the data storage device.

11. The computer system of claim 10, wherein the data storage device further comprises instructions that, when executed by the at least one processor, cause the at least one processor to:
add the second test data block to the second data block subset; and
modify the second Bloom filter to describe the second test data block.

12. The computer system of claim 5, wherein the data storage device further comprises instructions that, when executed by the at least one processor, cause the at least one processor to execute a first virtual machine and a hypervisor, and wherein the logical name comprises an address at a virtual memory device.

13. A method for matching a test data block to a data block set, comprising:
receiving, by a computing device, a test data block;
determining, by the computing device, that a first filter describing a first data block subset of the data block set indicates that the test data block is not in the first data block subset;
determining, by the computing device, that a second filter describing a second data block subset of the data block set indicates that the test data block is in the second data block subset, wherein an average reference frequency of the second data block subset is less than an average reference frequency of the first data block subset;

verifying, by the computing device, that the test data block is in the second data block subset; and returning, by the computing device, an indication that the test data block is in the data block set.

14. The method of claim 13, further comprising:

applying to the test data block a first set of hash functions of the first filter to generate a first set of test data block hash values;

comparing the first set of test data block hash values to a first bit vector of the first filter; and determining that a bit at the first bit vector having an index value equal to a first hash value from the first set of test data block hash values is not asserted.

15. The method of claim 13, wherein receiving the test data block comprises receiving a write request comprising the test data block and a logical name describing at least the test data block, and where returning the indication that the test data block is in the data block set comprises writing, to a data storage of the computing device, data associating the logical name with a location of an equivalent data block equivalent to the test data block.

16. The method of claim 13, further comprising:

determining, by the computing device, a reference frequency of a first data block selected from the data block set; and assigning, by the computing device, the first data block to the first data block subset based at least in part on the reference frequency of the first data block.

17. The method of claim 13, further comprising:

receiving, by the computing device, a second test data block;

determining, by the computing device, that the first filter indicates that the second test data block is not in the first data block subset;

determining, by the computing device, that the second filter indicates that the second test data block is not in the second data block subset;

determining, by the computing device, that all data block subsets of the data block set have been considered; and returning, by the computing device, an indication that the second test data block is not in the data block set.

18. The method of claim 17, further comprising adding, by the computing device, the test data block to at least one data block subset of the data block set.

19. The method of claim 13, further comprising, determine, by the computing device, the first data block subset based at least in part on a reference frequency of a first data block selected from the data block set.

20. The method of claim 13, wherein the data block set consists of a plurality of data blocks, further comprising:

ranking, by the computing device, the plurality of data blocks in order of reference frequency; and dividing the plurality of data blocks pro rata into a predetermined number of data block subsets including the first data block subset and the second data block subset.

* * * * *

UNITED STATES PATENT AND TRADEMARK OFFICE
CERTIFICATE OF CORRECTION

PATENT NO. : 9,792,042 B2
APPLICATION NO. : 14/919264
DATED : October 17, 2017
INVENTOR(S) : Huamin Chen It is certified that error appears in the above-identified patent and that said Letters Patent is hereby corrected as shown below:

In the Claims

In Column 15, Line 31 (Claim 4), replace "has" with --hash--.

Signed and Sealed this
Twenty-first Day of November, 2017

Joseph Matal
*Performing the Functions and Duties of the*
*Under Secretary of Commerce for Intellectual Property and*
*Director of the United States Patent and Trademark Office*